(12) United States Patent
Fujinaga

(10) Patent No.: US 10,932,314 B2
(45) Date of Patent: Feb. 23, 2021

(54) COMMUNICATION APPARATUS, CONTROL METHOD, AND STORAGE MEDIUM

(71) Applicant: CANON KABUSHIKI KAISHA, Tokyo (JP)

(72) Inventor: Takashi Fujinaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 164 days.

(21) Appl. No.: 16/136,072

(22) Filed: Sep. 19, 2018

(65) Prior Publication Data

US 2019/0104561 A1 Apr. 4, 2019

(30) Foreign Application Priority Data

Sep. 29, 2017 (JP) .............................. JP2017-191761

(51) Int. Cl.

| | | |
|---|---|---|
| *H04W 76/18* | (2018.01) | |
| *H04W 76/19* | (2018.01) | |
| *H04W 76/14* | (2018.01) | |
| *H04W 12/06* | (2009.01) | |
| *H04W 76/11* | (2018.01) | |
| *H04W 48/16* | (2009.01) | |
| *H04W 12/08* | (2009.01) | |
| *H04W 12/00* | (2009.01) | |
| *H04W 48/10* | (2009.01) | |
| *H04W 88/08* | (2009.01) | |

(52) U.S. Cl.
CPC .......... *H04W 76/18* (2018.02); *H04W 12/06* (2013.01); *H04W 12/08* (2013.01); *H04W 48/16* (2013.01); *H04W 76/11* (2018.02); *H04W 76/14* (2018.02); *H04W 76/19* (2018.02); *H04W 12/009* (2019.01); *H04W 48/10* (2013.01); *H04W 88/08* (2013.01)

(58) Field of Classification Search
CPC ... H04L 67/22; H04L 67/125; H04N 1/00315; H04N 1/00347; H04N 5/247; H04N 5/23206; H04N 5/23245; H04W 12/06; H04W 12/08; H04W 12/2803; H04W 76/11; H04W 76/14; H04W 76/18; H04W 76/19; H04W 48/16
See application file for complete search history.

(56) References Cited

U.S. PATENT DOCUMENTS

| | | | |
|---|---|---|---|
| 7,583,684 B2 * | 9/2009 | Cheng | |
| 10,009,816 B2 * | 6/2018 | Sato | |
| 2007/0229670 A1 * | 10/2007 | Soga | |
| 2012/0258658 A1 * | 10/2012 | Matsuo | |
| 2014/0253740 A1 * | 9/2014 | Barnwal et al. | |

FOREIGN PATENT DOCUMENTS

JP 2016-052006 A 4/2016

* cited by examiner

*Primary Examiner* — Marsha D Banks Harold
*Assistant Examiner* — Dharmesh J Patel
(74) *Attorney, Agent, or Firm* — Canon U.S.A., Inc. I.P. Division

(57) ABSTRACT

If a communication apparatus receives connection destination information for joining a second wireless network via a first wireless network created by the communication apparatus, the communication apparatus ends the first wireless network and attempts to join the second wireless network based on the received connection destination information. If the attempt to join the second wireless network fails, the communication apparatus re-creates the first wireless network.

16 Claims, 7 Drawing Sheets

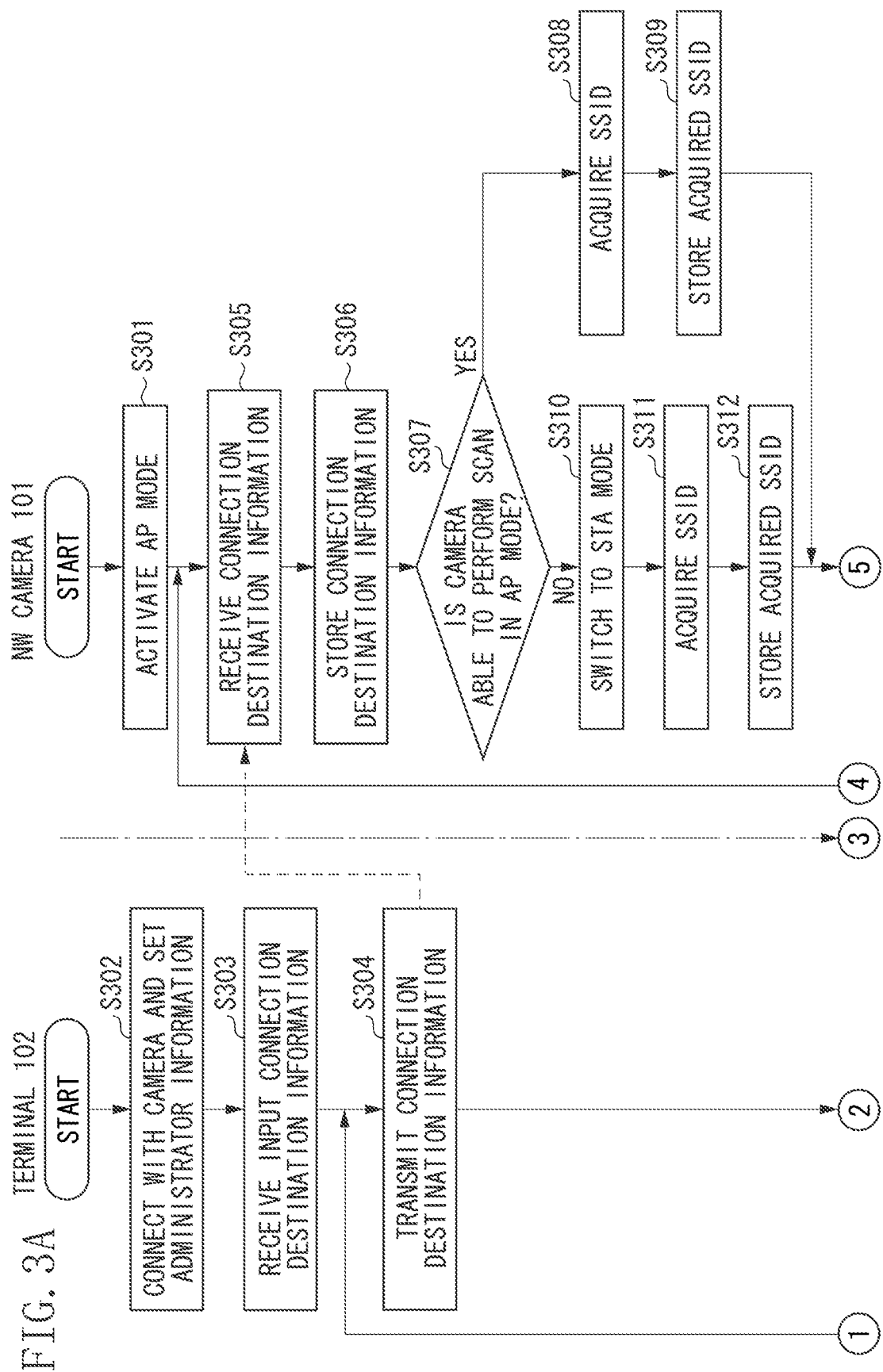

┌─────────────────────────────────────────────────────┐
 │  PLEASE ENTER ADMINISTRATOR ID AND PASSWORD         │
 │                                                     │
 │     ADMINISTRATOR ID  [      user      ]            │
 │                                                     │
 │          PASSWORD     [     ******     ]            │
 │                                                     │
 │              [OK]        [CANCEL]                   │
 └─────────────────────────────────────────────────────┘
```

COMMUNICATION APPARATUS, CONTROL METHOD, AND STORAGE MEDIUM

BACKGROUND

Field

The present disclosure relates to connections between a communication apparatus and another apparatus.

Description of the Related Art

In recent years, network cameras that perform wireless communication are widely used. Such network cameras wirelessly communicate with a terminal to enable a user to set the settings of the network camera using the terminal. In this case, the network camera operates as an access point (hereinafter, "AP") that creates a wireless network, whereas the terminal operates as a station (hereinafter, "STA") that joins the wireless network created by the AP. If such a network camera operates as an STA, the network camera can join a wireless network created by another AP. Parameters for joining the wireless network created by the other AP are transmitted from the terminal to the network camera to enable the network camera to join the wireless network created by the other AP.

Japanese Patent Application Laid-Open No. 2016-052006 discusses a technique in which a terminal acquires from an AP a parameter for wirelessly communicating with the AP and transmits the acquired parameter to another communication apparatus with which the terminal is connected.

In the case where a network camera operating as an AP and a terminal operating as an STA are wirelessly communicating with each other and the network camera is to join a wireless network created by another AP, the terminal transmits to the network camera a parameter for joining the wireless network. The network camera having received the parameter automatically switches the operation of the network camera from the AP to the STA and attempts to join the wireless network created by the other AP based on the received parameter. If the network camera fails to join the wireless network, since the network camera is operating as an STA, it is impossible for the network camera to wirelessly communicate again with the terminal operating as an STA, so that the network camera cannot receive a parameter from the terminal again.

SUMMARY

The present disclosure is directed to a technique for enabling a communication apparatus that received connection destination information for wirelessly communicating with another communication apparatus to re-connect with the communication apparatus that transmitted the connection destination information if the communication apparatus that received the connection destination information fails to connect with the another communication apparatus.

According to an aspect of the present disclosure, a communication apparatus includes one or more processors and one or more memories including instructions that, in a case where executed by the processor(s), cause the apparatus to create a first wireless network, receive first connection destination information for joining a second wireless network from a first another communication apparatus via the first wireless network, end the first wireless network in a case where the first connection destination information is received, attempt to join the second wireless network based on the first connection destination information in the case where the first connection destination information is received, and re-create the first wireless network that was ended in response to failure of the attempt to join the second wireless network, wherein the first another communication apparatus is notified of the failure of the attempt to join the second wireless network via the re-created first wireless network.

Further features will become apparent from the following description of exemplary embodiments with reference to the attached drawings.

BRIEF DESCRIPTION OF THE DRAWINGS

FIGS. 3A and 3B are flowcharts illustrating processing that is performed when the network camera receives connection destination information from the terminal.

FIG. 6 is a diagram illustrating an example of a screen displayed when the terminal receives a request for administrator information.

DESCRIPTION OF THE EMBODIMENTS

An exemplary embodiment will be described in detail below with reference to the attached drawings. Configurations described in the following exemplary embodiment are mere examples and are not intended to limit the scope of the disclosure.

Figure 1:
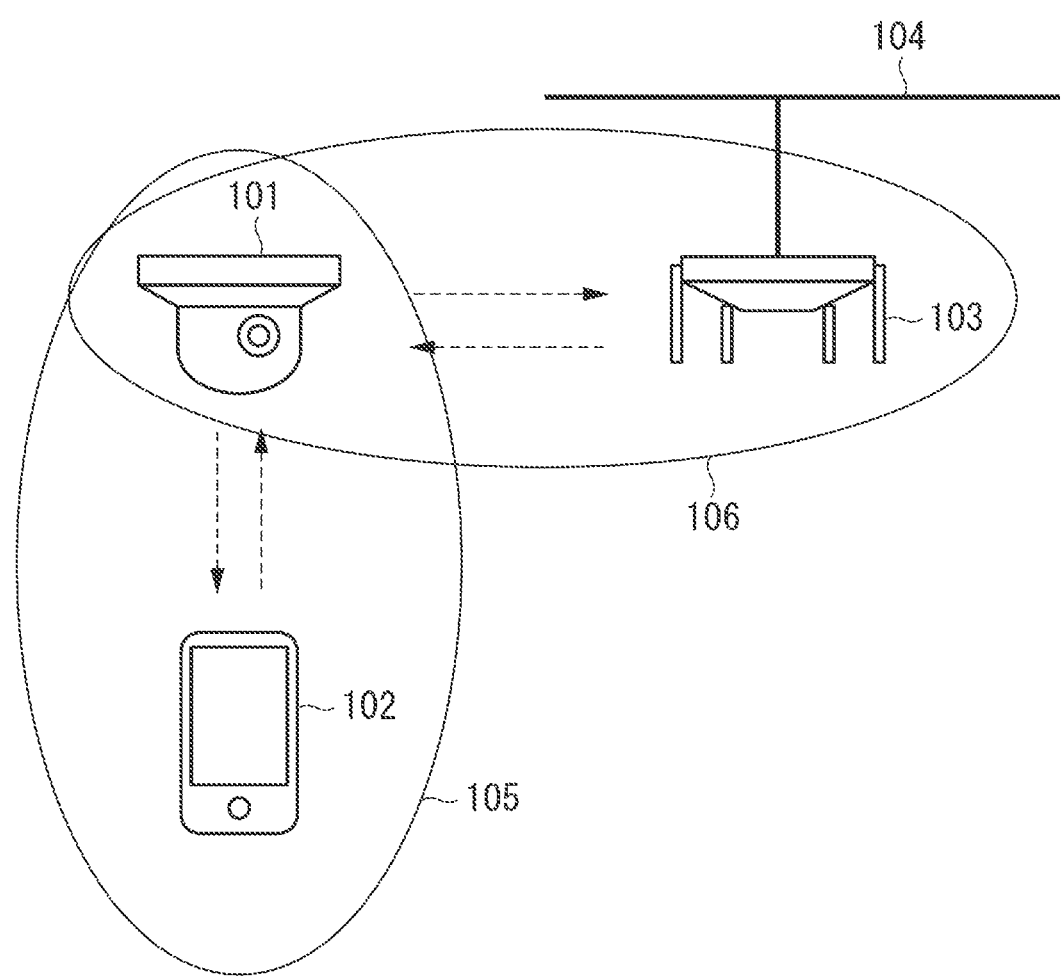
FIG. 1 is a diagram illustrating a network configuration of a network that a network camera joins.

FIG. 1 illustrates a network configuration of a network according to the present exemplary embodiment that a network camera (hereinafter, "NW camera") 101 joins.

In the present exemplary embodiment, the NW camera 101 wirelessly communicates with a terminal 102 via a network 105 and wirelessly communicates with an access point (hereinafter, "AP") 103 via a network 106.

The NW camera 101 includes an access point mode (hereinafter, "AP mode") and a station mode (hereinafter, "STA mode"). In the AP mode, the NW camera 101 performs wireless communication and operates as an AP. In the STA mode, the NW camera 101 performs wireless communication and operates as an STA.

In the case where the NW camera 101 operates in the AP mode, the role of the NW camera 101 is to create a wireless network. Specifically, first, the AP periodically transmits a beacon to other apparatuses. The beacon contains a service set identifier (SSID) of a network to be created by the AP and information about an encryption function. If an STA receives the beacon from the AP, the STA determines whether the SSID contained in the beacon matches an SSID set to the STA as connection destination information. If the SSIDs match, the STA and the AP transmit to each other a message about authentication and perform authentication processing. If no connection destination information is set to the STA, the STA displays the SSIDs contained in the received beacon and prompts a user of the STA to select an SSID and input connection destination information corresponding to the selected SSID. The STA, to which the connection destination information is input, and the AP transmit to each other a message about authentication and perform authentication processing. If the authentication processing is successful, the STA transmits an association request to the AP to request a connection with the AP. The NW camera 101 that received the association request transmits an association response, and the AP and the STA are connected with each other.

Alternatively, the STA can transmit a probe request to the AP to search for a nearby network with an SSID included in the probe request. If the SSID included in the received probe request matches the SSID of the network created by the AP, the AP transmits a probe response to the STA. The probe response contains the SSID of the network created by the AP and information about the encryption function. The STA that received the probe response and the AP transmit a message about authentication to each other and perform authentication processing. If the authentication processing is successful, the STA transmits an association request to the AP to request a connection with the AP. The NW camera 101 that received the association request transmits an association response, and the AP and the STA are connected with each other.

In the present exemplary embodiment, the NW camera 101 operating in the AP mode wirelessly communicates with the terminal 102 via the network 105. In this case, the terminal 102 operate as an STA. In the network 105, the NW camera 101 and the terminal 102 communicate with each other using a wireless communication method based on the Institute of Electrical and Electronics Engineers, Inc. (IEEE) 802.11 series standards. The NW camera 101 and the terminal 102 can use a communication method based on other wireless communication methods such as Bluetooth®, ultra-wide band (UWB), or Zigbee in addition to or in place of the wireless communication based on the IEEE 802.11 series standards. UWB includes a wireless universal serial bus (USB), wireless 1394, and wireless networking (WI-NET).

The terminal 102 is, for example, a tablet that wirelessly communicates with the NW camera 101 via the network 105. The terminal 102 is not limited to the tablet and can be any communication apparatus that performs wireless communication via a network, such as a personal computer (PC) or a smartphone. The terminal 102 manipulates the NW camera 101 and sets the settings of the NW camera 101 via the network 105. Specifically, information necessary for connecting with the AP 103 is transmitted as connection destination information to the NW camera 101 to enable the NW camera 101 to connect with the AP 103. The terminal 102 can also set the viewing angle of the NW camera 101, update firmware, set administrator information, change the administrator information, etc. The terminal 102 receives data from the NW camera 101. Specifically, the terminal 102 receives information about the processing executed by the NW camera 101. The terminal 102 can receive image data acquired by the NW camera 101 via image capturing and information acquired by sensors built in or connected with the NW camera 101.

In the case where the NW camera 101 operates in the STA mode, the role of the NW camera 101 is to join a wireless network created by another communication apparatus operating as an AP. In the present exemplary embodiment, the NW camera 101 operating in the STA mode connects with the AP 103 via the network 106. In the network 106, the NW camera 101 and the AP 103 communicate with each other using a wireless communication method based on the IEEE 802.11 series standards. The NW camera 101 and the AP 103 can use a communication method based on other wireless communication methods such as Bluetooth®, UWB, or Zigbee in addition to or in place of the wireless communication based on the IEEE 802.11 series standards.

The NW camera 101 operates in the AP mode to receive the connection destination information about the AP 103 from the terminal 102 being the STA. If the NW camera 101 receives the connection destination information about the AP 103, the NW camera 101 switches the operation mode of the NW camera 101 from the AP mode to the STA mode and can connect with the AP 103 based on the received connection destination information. The NW camera 101 operates in the STA mode and connects with the AP 103 so that the NW camera 101 can transmit captured images and acquired information to external apparatuses via the connected AP 103.

The AP 103 joins a network 104. The apparatus that joins the network 104 communicates using a wireless communication method based on the IEEE 802.11 series standards. Alternatively, the apparatus can use a communication method based on other wireless communication methods such as Bluetooth®, UWB, or Zigbee in addition to or in place of the wireless communication method based on the IEEE 802.11 series standards. Alternatively, a communication method based on a wired communication method such as Ethernet can be used.

The NW camera 101 transmits acquired image data to the AP 103 via the network 106. The AP 103 transmits the received image data to external image recording apparatuses and management apparatuses via the network 104. The NW camera 101 can transmit the connection state of the NW camera 101, information about the processing being executed, information acquired by the sensors built in or connected with the NW camera 101, etc. A management apparatus connected with the NW camera 101 via the network 104 can manipulate the NW camera 101 and set the settings of the NW camera 101.

Figure 2:
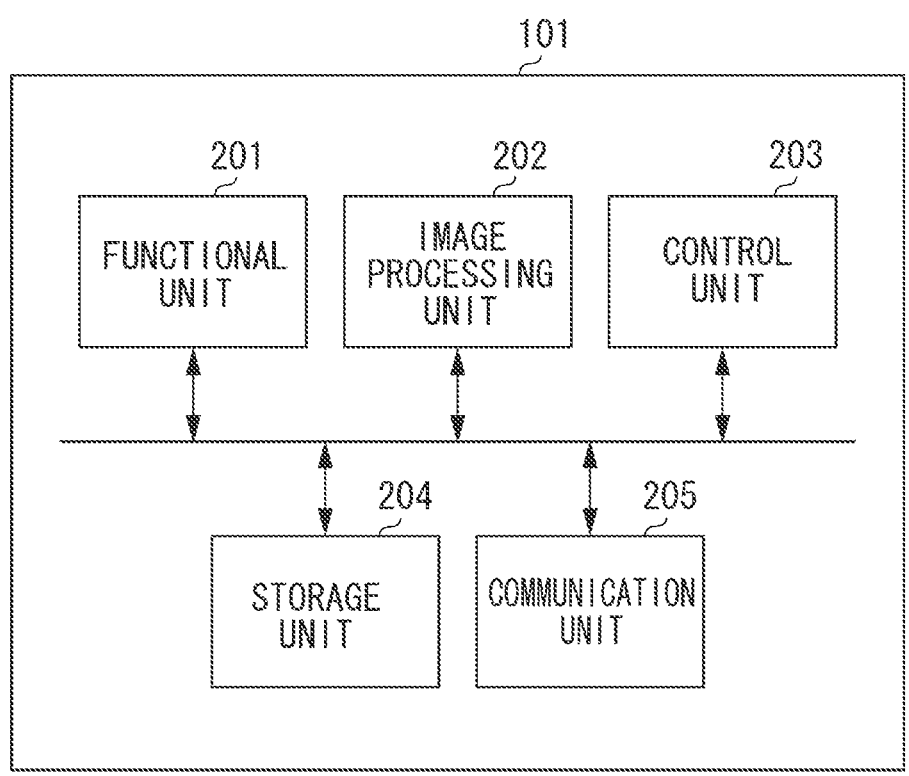
FIG. 2 is a block diagram illustrating a hardware configuration of the network camera and a terminal.

FIG. 2 illustrates a hardware configuration of the NW camera 101 and the terminal 102.

The NW camera 101 includes a functional unit 201, an image processing unit 202, a control unit 203, a storage unit 204, and a communication unit 205.

The functional unit 201 is hardware for the NW camera 101 to execute predetermined processing. In the NW camera 101, the functional unit 201 is an image capturing unit, includes a lens and an image sensor, captures images of subjects, and performs conversion of the captured images into electric signals. The functional unit 201 can include a sensor and/or hardware for executing other processing.

The functional unit 201 can include an output unit and an input unit. The output unit performs various types of output to the user via a speaker and a monitor screen. The NW camera 101 or another apparatus connected with the NW camera 101 can include the speaker and the monitor screen. The input unit receives various user manipulations. The input unit and the output unit can be realized by a single module, such as a touch panel.

The image processing unit 202 performs image processing and compression/encoding processing on the electric signals converted by the functional unit 201 to acquire image data.

The control unit 203 includes one or more processors, such as a central processing unit (CPU) or a microprocessing unit (MPU) and executes a program stored in the storage unit 204 described below to control the entire NW camera 101. Alternatively, the control unit 203 can control the entire NW camera 101 through cooperation between the program stored in the storage unit 204 and an operating system (OS). The control unit 203 can include a plurality of processors, such as multi-core processors, and the plurality of processors can control the entire NW camera 101.

The storage unit 204 includes one or more memories, such as a read-only memory (ROM) or random-access memory (RAM), and stores programs (computer programs) for executing various operations and various types of information such as communication parameters. The storage unit 204 stores user-set parameters for image quality adjustment at the time of image data acquisition by the NW camera 101. The storage unit 204 can use previously-set parameters even when the NW camera 101 is rebooted. The parameters can be set autonomously by the NW camera 101 or preset to the NW camera 101.

A storage medium, such as a flexible disk, a hard disk, an optical disk, a magneto-optical disk, a compact disk ROM (CD-ROM), a compact disk readable (CD-R), a magnetic tape, a non-volatile memory card, or a digital versatile disk (DVD), can be used as the storage unit 204 in addition to the memory such as the ROM or the RAM. The storage unit 204 can include a plurality of memories.

The communication unit 205 controls wireless communication based on the IEEE 802.11 series standards, wired communication such as wired local area network (LAN) communication, Internet Protocol (IP) communication, etc. The communication unit 205 includes two operation modes, the AP mode and the STA mode. The communication unit 205 controls wireless communication with the terminal 102 via the network 105 to receive manipulations and settings from the terminal 102 and transmit information to the terminal 102. The communication unit 205 controls wireless communication with the AP 103 via the network 106 and transmits image data and information to the AP 103. The communication unit 205 includes an antenna and controls the antenna to transmit and receive wireless signals for wireless communication. The antenna can be a separate device from the NW camera 101.

The terminal 102 includes a functional unit 201, a control unit 203, a storage unit 204, and a communication unit 205. The control unit 203, the storage unit 204, and the communication unit 205 are similar to those of the NW camera 101, so description thereof is omitted. The functional unit 201 of the terminal 102 is hardware for the terminal 102 to execute predetermined processing. For example, in the case where the terminal 102 is a smartphone, the functional unit 201 includes an input unit and an output unit to receive various user manipulations and perform various types of output to the user. The input unit and the output unit can be realized by a single module, such as a touch panel. In the case where the terminal 102 includes an image capturing function, the functional unit 201 includes an image capturing unit and the image processing unit 202.

Figure 3B:
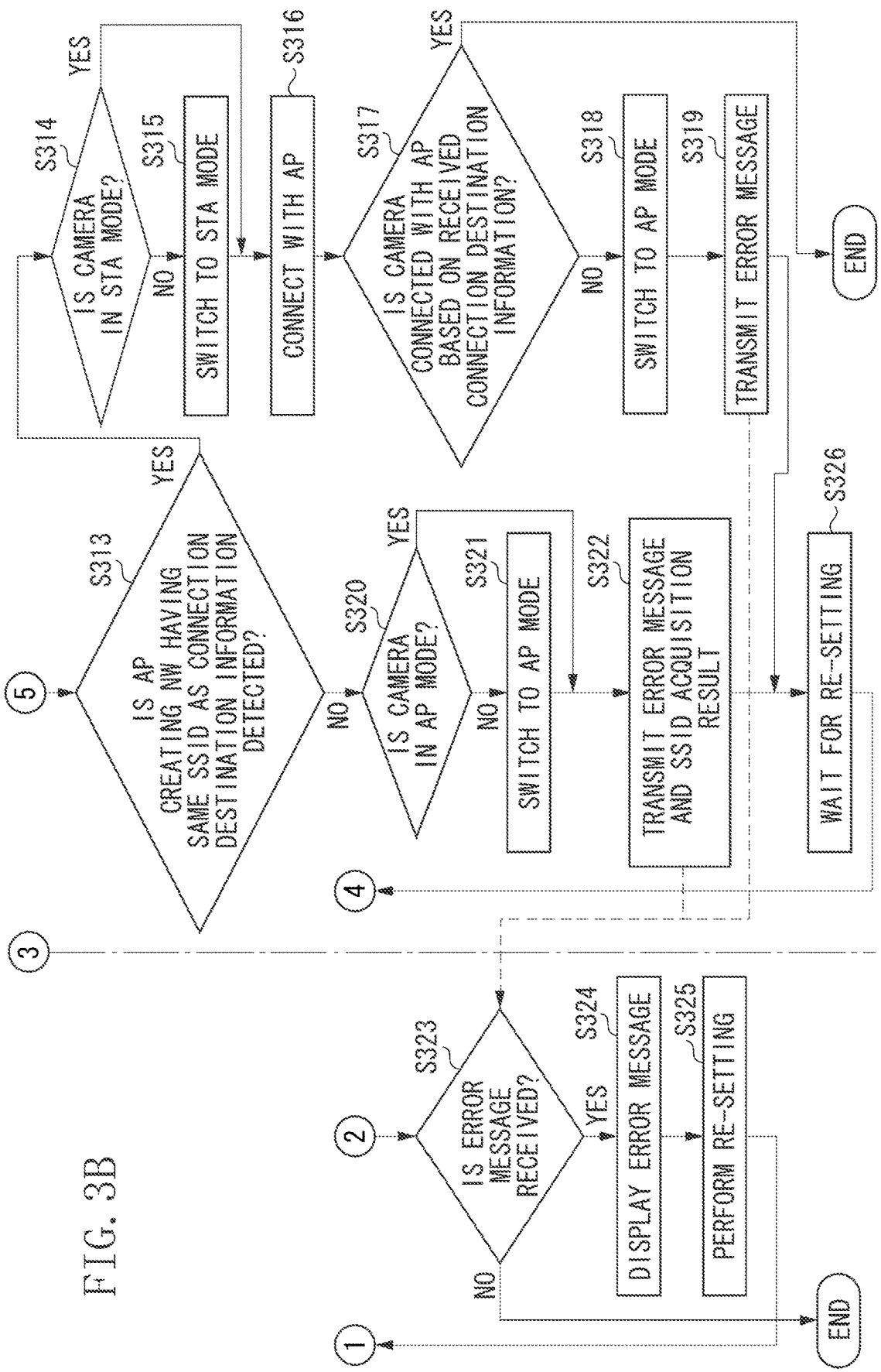

FIGS. 3A and 3B are flowcharts illustrating processing performed by the NW camera 101 and the terminal 102 when the NW camera 101 receives connection destination information from the terminal 102. As to the flowchart with respect to the NW camera 101, the control unit 203 of the NW camera 101 reads and executes the program stored in the storage unit 204 of the NW camera 101 to realize the flowchart. As to the flowchart with respect to the terminal 102, the control unit 203 of the terminal 102 reads and executes the program stored in the storage unit 204 of the terminal 102 to realize the flowchart.

The flowchart with respect to the NW camera 101 starts when power is supplied to the NW camera 101 to which no network setting is set. The phrase "no network setting is set" indicates that no connection destination information about the AP(s) with which the NW camera 101 is connectable is stored in the storage unit 204 of the NW camera 101. Alternatively, the flowchart can start when a setting mode of the NW camera 101 is selected. The setting mode of the NW camera 101 is the mode in which the terminal 102 inputs, deletes, and changes connection destination information about the AP with which the NW camera 101 is to be connected via the network 105. The flowchart with respect to the terminal 102 starts when power is supplied to the terminal 102.

In step S301, the control unit 203 of the NW camera 101 activates the communication unit 205 in the AP mode. After the activation in the AP mode, the control unit 203 of the NW camera 101 periodically transmits a beacon to other STA apparatuses.

In step S302, the control unit 203 of the terminal 102 connects with the NW camera 101 activated in the AP mode in step S301 and sets administrator information settings. Specifically, the control unit 203 of the terminal 102 first receives a beacon from the NW camera 101 and determines whether the preset connection destination information matches the SSID contained in the received beacon. If the preset connection destination information matches the SSID, the control unit 203 of the terminal 102 transmits a message about authentication to the NW camera 101. The NW camera 101 also transmits a message about authentication to the terminal 102 and performs authentication processing. If the authentication processing is successful, the control unit 203 of the terminal 102 transmits an association request to the NW camera 101. If the NW camera 101 receives the association request, the NW camera 101 transmits an association response to the terminal 102. In this way, the terminal 102 is connected with the NW camera 101.

When the terminal 102 is connected with the NW camera 101, the user activates a web browser of the terminal 102 and inputs the IP address of the NW camera 101 to the web browser. In the present exemplary embodiment, the IP address used by the NW camera 101 is determined at the time of shipment and the user knows the IP address in advance and inputs the IP address.

Alternatively, if the user knows a media access control (MAC) address of the NW camera 101 in advance, the user can identify the IP address of the NW camera 101 from the MAC address of the NW camera 101. Specifically, if the user inputs the MAC address to the terminal 102, the terminal 102 broadcasts a Reverse Address Resolution Protocol (RARP) request containing the MAC address of the NW camera 101 within the network (the network 105 in the present exemplary embodiment) the terminal 102 is participating in. If the MAC address contained in the RARP request is the MAC address of the NW camera 101 having received the RARP request, the NW camera 101 transmits a RARP response containing the IP address of the NW camera 101 to the terminal 102. Receiving the RARP response, the terminal 102 acquires the IP address of the NW camera 101. The terminal 102 notifies the user of the received IP address of the NW camera 101. Then, the user having received the notification of the IP address of the NW camera 101 inputs the IP address to the web browser. Alternatively, the terminal 102 can input to the web browser the IP address of the NW camera 101 which is received autonomously by the terminal 102.

If the IP address of the NW camera 101 is input to the web browser of the terminal 102, the web browser changes to a setting screen of the NW camera 101. If administrator information is still unset to the NW camera 101, the web browser of the terminal 102 changes to an administrator information setting screen for setting an ID and a password that are administrator information. If the administrator information setting screen is displayed, the ID and the password are input as administrator information about the NW camera 101 to the terminal 102 by the user. The control unit 203 of the terminal 102 transmits the input administrator information to the NW camera 101. The NW camera 101 stores the received administrator information in the storage unit 204. In this way, the administrator information is set to the NW camera 101 to enable execution of user authentication so that the user allowed to set connection destination information to the NW camera 101 is limited to the user who knows the administrator information. If the administrator information setting is completed, the web browser of the terminal 102 changes to a wireless LAN connection setting screen for setting connection destination information to the NW camera 101.

In the case where administrator information is already set to the NW camera 101, if the user inputs the IP address of the NW camera 101 to the web browser of the terminal 102, the web browser of the terminal 102 changes to an administrator information request screen for requesting administrator information. The administrator information request screen will be described below with reference to FIG. 6. When the terminal 102 transmits the user-input administrator information (ID and password) to the NW camera 101, the NW camera 101 determines whether the administrator information stored in the storage unit 204 matches the administrator information transmitted from the terminal 102. The NW camera 101 notifies the terminal 102 of the determination result. If the two pieces of administrator information match, the web browser of the terminal 102 changes to the wireless LAN connection setting screen. If the two pieces of administrator information do not match, the web browser of the terminal 102 changes again to the screen for checking administrator information. In the case where the two pieces of administrator information do not match, the terminal 102 can notify the user that the input administrator information does not match the administrator information of the NW camera 101.

The web browser of the terminal 102 can change to a setting screen for setting various settings, e.g., the setting of the viewing angle of the NW camera 101, the updating of the firmware, and the changing of the administrator information, instead of the wireless LAN connection setting screen. In this case, the user selects a wireless LAN connection setting in the setting screen to change the web browser of the terminal 102 to the wireless LAN connection setting screen.

Next, in step S303, the functional unit 201 of the terminal 102 receives input of connection destination information necessary for wireless communication with the AP 103. The input of the connection destination information is performed by the user. As to the input, the terminal 102 can autonomously input connection destination information about the AP with which the terminal 102 wirelessly communicates, or connection destination information held by the terminal 102.

Figure 4:
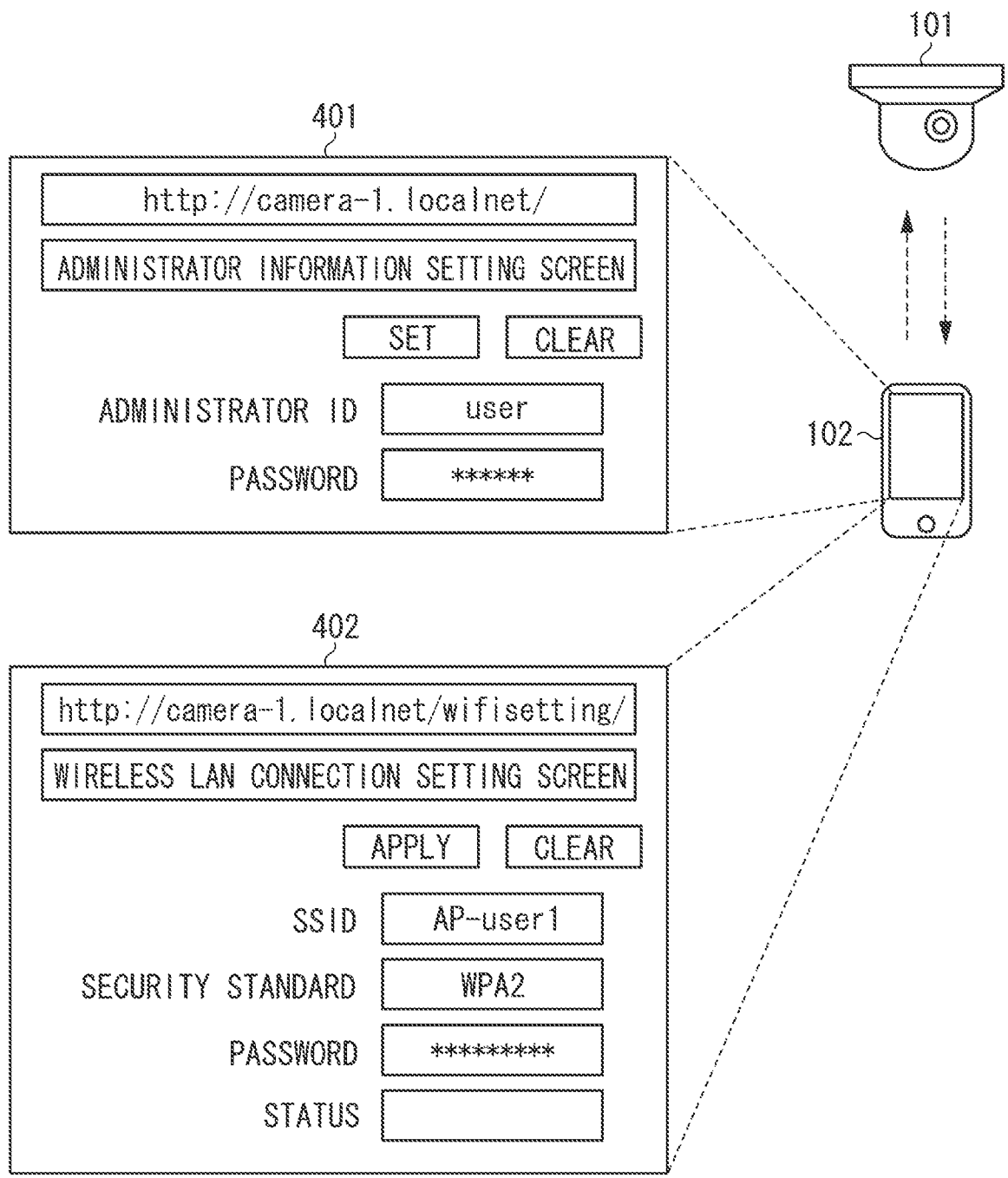
FIG. 4 is a diagram illustrating examples of a screen displayed when the terminal communicates with the network camera.

FIG. 4 illustrates examples of the screen displayed on the terminal 102 in steps S302 and S303 in FIG. 3A. The user can set administrator information by manipulating an administrator information setting screen 401 from the web browser displayed on the screen of the terminal 102. Similarly, the user can input connection destination information about the AP 103 by manipulating a wireless LAN connection setting screen 402 from the web browser.

The administrator information setting screen 401 is a screen displayed by the terminal 102 at the time of setting administrator information in step S302. The user inputs an administrator ID and a password for identifying the administrator and selects a setting key. The terminal 102 transmits the input administrator ID and the input password to the NW camera 101 to set the administrator information.

The wireless LAN connection setting screen 402 is a screen displayed on the terminal 102 when the user inputs connection destination information about the AP 103 in step S303. The connection destination information is specifically the SSID (network name) of the network created by the AP 103, the security standards, and the password. SSID is an identifier of a network created by an AP and consists of alphanumeric characters.

When the AP 103 and the NW camera 101 are to perform wireless communication, the AP 103 authenticates the NW camera 101 and the AP 103 and the NW camera 101 encrypt data transmitted and received therebetween based on security standards. Examples of security standards include Wired Equivalent Privacy (WEP) standards, Wi-Fi Protected Access® (WPA™) standards, and WPA2™ standards.

The WEP standards are security standards defining data encryption using shared key cryptography based on encryption algorithms called Revest Cipher 4 (RC4) (or ARCFOUR), and a WEP method is used as an encryption method. The WPA™ standards are security standards that use the Temporal Key Integrity Protocol (TKIP) as an encryption method. The WPA2™ standards are security standards that use the Counter Mode with Cipher-Block Chaining Message Authentication Code Protocol (CCMP) as an encryption method.

If the user inputs connection destination information and selects an apply key, the input connection destination information is transmitted to the NW camera 101. The terminal 102 can transmit connection destination information containing no password in the case of connecting the NW camera 101 with an AP to which no password is set.

Next, in step S304, the control unit 203 of the terminal 102 transmits the input connection destination information about the AP 103 to the NW camera 101. The terminal 102 transmits the connection destination information about the AP 103 via the connection between the NW camera 101 and the terminal 102 that is established in step S302.

Then, in step S305, the communication unit 205 of the NW camera 101 receives from the terminal 102 the connection destination information about the AP 103. In step S306, the storage unit 204 of the NW camera 101 stores the received connection destination information about the AP 103.

In step S307, the control unit 203 of the NW camera 101 determines whether the NW camera 101 can acquire an SSID from an AP located near the NW camera 101 while remaining in the AP mode.

If the control unit 203 of the NW camera 101 determines that the NW camera 101 can acquire the SSID while remaining in the AP mode (YES in step S307), then in step S308, the control unit 203 of the NW camera 101 acquires the SSID. The NW camera 101 acquires the SSID to search for a network created by the AP that is located near the NW camera 101 and with which the NW camera 101 can wirelessly communicate. There are two methods for the SSID acquisition, passive scan and active scan. In the passive scan, the NW camera 101 receives beacons transmitted from APs located near the NW camera 101 to acquire an SSID of a network created by the APs. In the present exemplary embodiment, the NW camera 101 performs the passive scan to acquire the SSID. In the active scan, the NW camera 101 sets the connection settings of wireless communication, including the SSID, in advance. Then, the NW camera 101 transmits a probe request containing the preset SSID and receives a probe response as a response to the probe request to search for an AP that has the preset SSID and creates a network. In the present exemplary embodiment, since the NW camera 101 receives the connection destination information from the terminal 102 in step S305, the active scan can be performed. The passive scan and the active scan can both be performed. The active scan can be performed with respect to a network with an SSID acquired by the passive scan.

In step S309, the control unit 203 of the NW camera 101 stores the acquired SSID in the storage unit 204. More specifically, the control unit 203 of the NW camera 101 stores in the storage unit 204 a list of SSIDs that are detected by the passive scan and are SSIDs of networks created by APs with which the NW camera 101 can wirelessly communicate.

If the control unit 203 determines that the NW camera 101 cannot acquire the SSID while remaining in the AP mode (NO in step S307), then in step S310, the control unit 203 of the NW camera 101 switches the communication unit 205 to the STA mode. Specifically, the control unit 203 of the NW camera 101 performs control such that the power supply of the NW camera 101 is turned off and then the NW camera 101 is rebooted in the STA mode. In step S311, the control unit 203 of the NW camera 101 acquires the SSID as in step S308. Then, in step S312, the control unit 203 of the NW camera 101 stores in the storage unit 204 the SSID acquired in step S311, as in step S309.

In the case where whether the NW camera 101 is to acquire the SSID in the AP mode or the STA mode is predetermined, the control unit 203 of the NW camera 101 does not have to perform the determination in step S307. Whether to acquire the SSID in the AP mode or the STA mode can be preset or determined by the user. In this case, the determination in step S307 is skipped, and the processing proceeds to step S308 if the SSID is to be acquired in the AP mode. The processing proceeds to step S310 if the SSID is to be acquired in the STA mode.

In step S313, the control unit 203 of the NW camera 101 determines, based on the acquired SSID, whether the AP 103 creating the network of the same SSID as the SSID of the connection destination information stored in step S306 is detected.

If the control unit 203 of the NW camera 101 determines that the AP 103 creating the network of the same SSID as the SSID received from the terminal 102 is detected (YES in step S313), then in step S314, the control unit 203 of the NW camera 101 determines whether the NW camera 101 is in the STA mode. If the control unit 203 of the NW camera 101 determines that the communication unit 205 of the NW camera 101 is not in the STA mode (NO in step S314), then in step S315, the control unit 203 of the NW camera 101 switches the communication unit 205 to the STA mode. More specifically, the control unit 203 of the NW camera 101 performs control to turn off the power supply of the NW camera 101 and reboot the NW camera 101 in the STA mode. If the communication unit 205 of the NW camera 101 is in the STA mode (YES in step S314), then in step S316, the control unit 203 of the NW camera 101 attempts to connect with the AP 103 based on the connection destination information received in step S305. Specifically, the control unit 203 of the NW camera 101 attempts to connect with the AP 103 creating the network with the same SSID as the SSID of the received connection destination information using the password of the received connection destination information.

In step S317, the control unit 203 of the NW camera 101 determines whether the NW camera 101 is connected with the AP 103 based on the received connection destination information. If the control unit 203 of the NW camera 101 determines that the NW camera 101 is connected with the AP 103 (YES in step S317), the process in the flowchart ends.

If the control unit 203 of the NW camera 101 determines that the NW camera 101 is not connected with the AP 103 (NO in step S317), then in step S318, the control unit 203 of the NW camera 101 switches the communication unit 205 of the NW camera 101 to the AP mode. More specifically, the control unit 203 of the NW camera 101 performs control to turn off the power supply of the NW camera 101 and reboot the NW camera 101 in the AP mode. Then, in step S319, the control unit 203 of the NW camera 101 transmits an error message as a notification to the terminal 102. The transmitted error message can contain a reason for the failure of the attempt to connect with the AP 103 in step S316. For example, the error message can contain the message that the attempt to connect with the AP 103 in step S316 failed because the password received in step S305 was incorrect. The error message can contain the message that the AP 103 is incompatible with the security standards received in step S305. The error message can contain the message that the connection of the NW camera 101 has been denied by the MAC address filtering of the AP 103. The error message can contain the message that that the connection by the NW camera 101 has been denied because the number of STAs connected with the AP 103 has already reached the upper limit of the number of STAs connectable with the AP 103.

If the control unit 203 of the NW camera 101 determines that the AP 103 creating the network of the same SSID as the SSID received from the terminal 102 is not detected (NO in step S313), then in step S320, the control unit 203 of the NW camera 101 determines whether the communication unit 205 is in the AP mode. If the control unit 203 of the NW camera 101 determines that the communication unit 205 is not in the AP mode (NO in step S320), then in step S321, the control unit 203 of the NW camera 101 switches the communication unit 205 to the AP mode and performs the processing in step S322. Specifically, the control unit 203 of the NW camera 101 performs control to turn off the power supply of the NW camera 101 and reboot the NW camera 101 in the AP mode. If the control unit 203 of the NW camera 101 determines that the communication unit 205 of the NW camera 101 is in the AP mode (YES in step S320), step S321 is skipped, and the processing proceeds to step S322. In step S322, the control unit 203 of the NW camera 101 transmits an error message to the terminal 102. The transmitted error message contains the message that the connection with the AP 103 failed because the AP 103 creating the network with the same SSID as the SSID received in step S305 was not detected. The detected SSID list stored in the storage unit 204 in step S309 or S312 is also transmitted. In the case where the active scan is performed in step S308 or S311, only the error message is transmitted in step S322.

In step S323, the control unit 203 of the terminal 102 determines whether an error message is received from the NW camera 101. The terminal 102 waits for a predetermined time to receive an error message from the NW camera 101. If the control unit 203 of the terminal 102 determines that no error message is received from the NW camera 101 (NO in step S323), the flowchart ends. If the control unit 203 of the terminal 102 determines that an error message is received (YES in step S323), then in step S324, the control unit 203 of the terminal 102 performs displaying based on the error message received in step S323. Then, the control unit 203 of the terminal 102 executes the processing in step S325.

Figure 5:
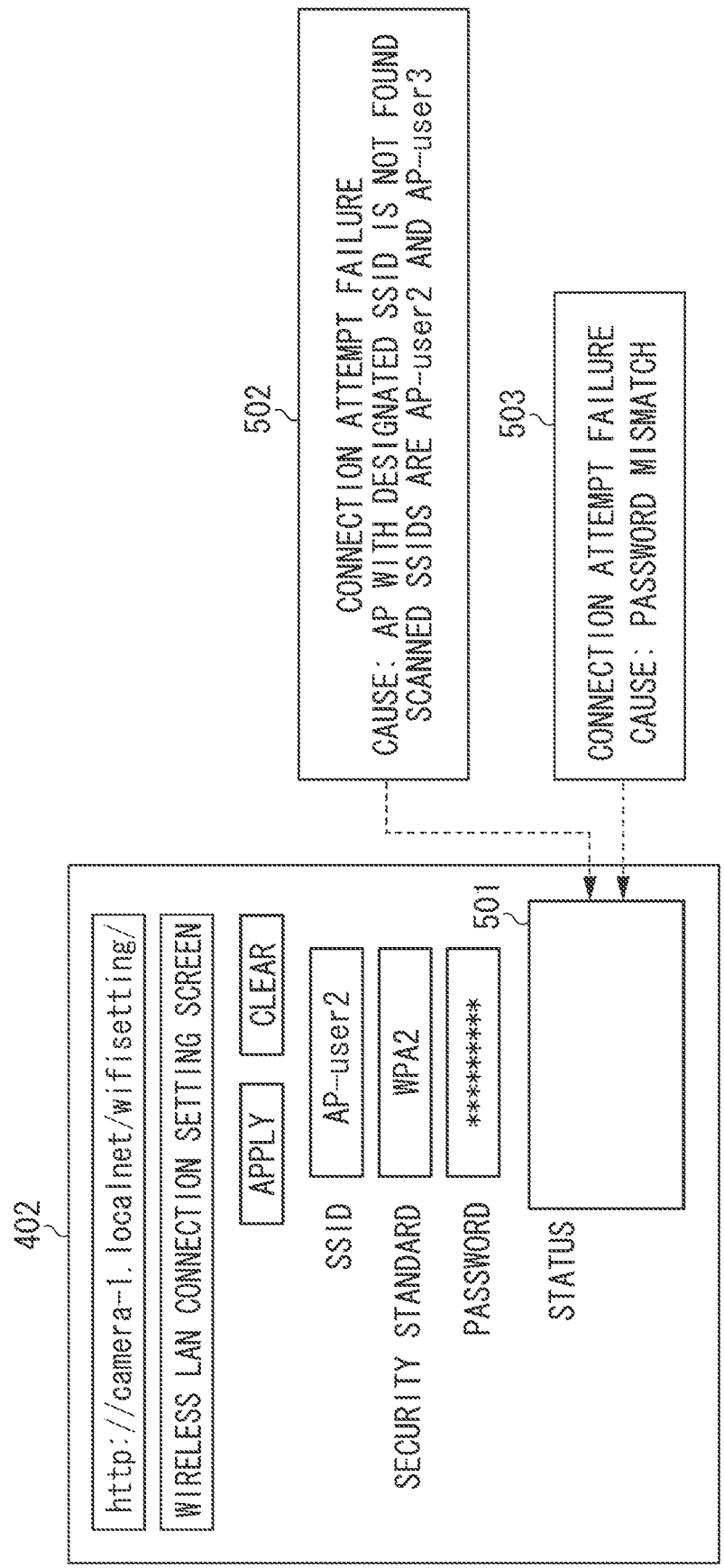
FIG. 5 is a diagram illustrating examples of a screen displayed when the terminal receives an error message.

FIG. 5 illustrates examples of the screen displayed when the terminal 102 receives the error message. The terminal 102 performs displaying based on the received error message in a status 501 of the wireless LAN connection setting screen 402 in FIG. 4.

A connection attempt failure 502 is a display based on the error message transmitted by the NW camera 101 in step S322. In the display, the message that the AP creating the network with the same SSID as the SSID transmitted as the connection destination information by the terminal 102 has not been found is displayed. In the case where the result of SSID acquisition is also transmitted in step S322, the SSID list of the networks created by the APs detected by the NW camera 101 is displayed in the connection attempt failure 502.

A connection attempt failure 503 is a display based on the error message transmitted by the NW camera 101 in step S319. In the display, the message that the attempt to connect with the AP 103 has failed because the password transmitted as the connection destination information by the terminal 102 was incorrect is displayed.

Alternatively, in steps S319 and S322, the terminal 102 can display just the message that the NW camera 101 has failed to connect with the AP 103.

While the NW camera 101 transmits the error message in the present exemplary embodiment, a message indicating that the NW camera 101 is connectable with the AP 103 can be transmitted to the terminal 102 when it is determined in step S317 that the NW camera 101 is connectable with the AP 103. In this case, the NW camera 101 switches the operation mode of the NW camera 101 from the AP mode to the STA mode and transmits the message. Then, the NW camera 101 changes the operation mode of the NW camera 101 again to the AP mode. The terminal 102 can display the message that the NW camera 101 is connectable with the AP 103 based on the received message in the status 501 of the wireless LAN connection setting screen 402.

In step S324, the control unit 203 of the terminal 102 displays the error message, and in step S325, the control unit 203 of the terminal 102 re-sets to the NW camera 101 a connection destination of the NW camera 101. Specifically, the control unit 203 of the terminal 102 receives input of connection destination information changed in at least one of the SSID and the password as new connection destination information. The input of the connection destination information is performed by the user. As to the input of the connection destination information, the terminal 102 can autonomously input connection destination information about the AP with which the terminal 102 wirelessly communicates, or connection destination information held by the terminal 102. In this case, in step S326, the control unit 203 of the NW camera 101 is in a re-setting standby state. At the time of re-setting the connection destination from the terminal 102, the control unit 203 of the NW camera 101 requests the administrator information stored in the storage unit 204 from the terminal 102. Specifically, the control unit 203 of the NW camera 101 requests the administrator ID and the password set by the terminal 102 in step S302. As described above, the NW camera 101 requests the administrator information from the terminal 102 at the time of re-setting the connection destination to prevent re-setting from a third party.

FIG. 6 illustrates an example of the screen displayed when the terminal 102 receives the request for administrator information. An administrator information request 600 is a screen displayed to prompt the user to input the administrator ID and the password that are set in step S302. If the user inputs the administrator ID and the password and presses "OK", the information is transmitted to the NW camera 101. The NW camera 101 determines whether the received administrator ID and password match the administrator information stored in the storage unit 204 of the NW camera 101. If the received administrator ID and password match the stored administrator information, the NW camera 101 accepts the re-setting of the connection destination from the terminal 102. If the received administrator ID and password do not match the stored administrator information, the NW camera 101 does not accept the re-setting of the connection destination from the terminal 102. The phrase "accepts the re-setting of the connection destination" indicates that the NW camera 101 receives new connection destination information transmitted from the terminal 102. The phrase "does not accept the re-setting of the connection destination" indicates that the NW camera 101 does not receive new connection destination information transmitted from the terminal 102. In the case of receiving new connection destination information, step S306 and subsequent steps can be performed based on the received new connection destination information.

Alternatively, the NW camera 101 can receive new connection destination information from the terminal 102 regardless of whether or not accepting the re-setting of the connection destination. Then, in the case of accepting the re-setting of the connection destination, step S306 and subsequent steps can be performed based on the received new connection destination information. In the case where the NW camera 101 does not accept the re-setting of the connection destination, the received new connection destination information can be discarded.

In the case in which the administrator ID and the password to be input to the administrator information request 600 are stored in the storage unit 204 of the terminal 102, the terminal 102 can automatically transmit the administrator ID and the password to the NW camera 101. Alternatively, the administrator ID and the password can autonomously be transmitted together at the time of transmitting new connection destination information to the NW camera 101.

In step S325, the administrator information request 600 can be displayed in response to the press of "apply" on the wireless LAN connection setting screen 402 by the user or in response to receipt of the error message from the NW camera 101. Alternatively, the administrator information request 600 can be displayed if a predetermined time passes after the previous setting or manipulation of the NW camera 101 from the terminal 102 is performed. Alternatively, the administrator information request 600 can be displayed if the terminal 102 receives a user input again in the case where the predetermined time passes after the previous setting or manipulation of the NW camera 101 from the terminal 102 is performed.

In the present exemplary embodiment, if the NW camera 101 operating in the AP mode receives the connection destination information from the terminal 102, the operation mode is switched to the STA mode, and the NW camera 101 attempts to connect with the AP based on the received connection destination information. If the attempt to connect with the AP based on the received connection destination information fails, the NW camera 101 switches the operation mode to the AP mode and connects with the terminal 102. As described above, the NW camera 101 having failed to connect with the AP switches the operation mode of the NW camera 101 to the AP mode to re-connect with the terminal 102 and receive new connection destination information. The NW camera 101 is re-connected with the terminal 102 so that the NW camera 101 can notify the terminal 102 of the failure of the attempt to connect with the AP.

The NW camera 101 can not only transmit images captured by the NW camera 101 and information acquired by the NW camera 101 to external apparatuses via the AP 103, but can also directly transmit images captured by the NW camera 101 and information acquired by NW camera 101 to another terminal with which the NW camera 101 wirelessly communicates. In this case, the NW camera 101 operates in the AP mode to transmit captured images and acquired information.

The NW camera 101 can include the AP mode for transmitting captured images and acquired information and the AP mode for receiving connection destination information. The following discusses the case in which the NW camera 101 operates in the AP mode for transmitting captured images and acquired information before the start of the flowchart in FIG. 3A. In this case, if the flowchart in FIG. 3A is started, the NW camera 101 switches the operation mode to the AP mode for receiving connection destination information. The network created by the NW camera 101 in the case where the NW camera 101 operates in the AP mode for transmitting captured images and acquired information is different from the network created by the NW camera 101 in the case where the NW camera 101 operates in the AP mode for receiving connection destination information. In the case where the NW camera 101 operates in the AP mode for transmitting captured images and acquired information, the created network includes an optional SSID and an encryption key is set. In the case where the NW camera 101 operates in the AP mode for receiving connection destination information, the created network includes a fixed SSID and no encryption key is set. In the case in which the NW camera 101 operates in the AP mode for receiving connection destination information, the SSID of the created network can be optional and an encryption key can be set. If the NW camera 101 receives connection destination information from the terminal 102, the NW camera 101 switches the operation mode of the NW camera 101 from the AP mode for receiving connection destination information to the STA mode for connecting with another AP. Then, if the attempt to connect with the AP based on the connection destination information fails, the operation mode is switched from the STA mode to the AP mode for receiving connection destination information.

In the present exemplary embodiment, the NW camera 101 in the re-setting standby state requests administrator information from the terminal 102 to prevent the re-setting from a third party. The present exemplary embodiment is not limited to the foregoing, and the MAC address of the terminal 102 can be stored in the storage unit 204 of the NW camera 101 at the time of receiving connection destination information in step S305 to prevent the re-setting from a third party. Specifically, the control unit 203 of the NW camera 101 permits only the re-setting from the terminal 102 with the MAC address stored in the storage unit 204 in step S326. In this case, a time limit can be set to the MAC address stored in the NW camera 101, and if the set time limit expires, re-setting from the terminal 102 with a different MAC address from the stored MAC address can be permitted.

In step S313, if the control unit 203 of the NW camera 101 determines that the AP 103 creating the network of the same SSID as the received SSID is not detected (NO in step S313), the control unit 203 of the NW camera 101 can re-acquire the SSID. In this case, the control unit 203 of the NW camera 101 acquires the SSID repeatedly until the control unit 203 of the NW camera 101 determines in step S313 that the AP creating the network of the same SSID as the received SSID is detected. Alternatively, the SSID acquisition can be repeated until the user provides a stop instruction via the terminal 102 or can be repeated a predetermined number of times or for a predetermined time. The predetermined number of times and the predetermined time are determined by the user. Alternatively, the predetermined number of times and the predetermined time can be preset to the NW camera 101.

In the present exemplary embodiment, a display based on a received error message is displayed in the status 501 on the wireless LAN connection setting screen 402 in the case where the terminal 102 receives the error message from the NW camera 101. The present exemplary embodiment is not limited to the foregoing, and the terminal 102 can acquire every predetermined time from the NW camera 101 information about the connection of the NW camera 101 with the AP 103 and perform displaying based on the acquired information. For example, in the case where SSID acquisition for connecting the NW camera 101 with the AP 103 is performed, the displaying performed by the terminal 102 is to display the message that SSID acquisition is performed. The terminal 102 can acquire from the NW camera 101 information about the connection of the NW camera 101 with the AP 103 based on a user manipulation. The NW camera 101 can autonomously transmit the information to the terminal 102 every predetermined time or when there is a change in the connection of the NW camera 101 with the AP 103.

In the present exemplary embodiment, the control unit 203 of the NW camera 101 performs control to turn off the power supply of the NW camera 101 and then reboot the NW camera 101 in a desired operation mode when switching the operation mode of the NW camera 101. Alternatively, the operation mode can be switched without turning off the power supply of the NW camera 101. Alternatively, the user can reboot the NW camera 101 to switch the operation mode of the NW camera 101.

Any processing or user manipulation can be added between the steps in the flowchart in FIGS. 3A and 3B.

In the case in which the control unit 203 of the NW camera 101 determines that the NW camera 101 is connected with the AP 103 (YES in step S317) and the NW camera 101 operates in the STA mode and is connected with another AP, if the connection is disconnected, the NW camera 101 periodically determines whether the connection with the AP 103 is maintained. If the NW camera 101 determines that the connection with the AP 103 is disconnected for some reason, the NW camera 101 performs step S318 and subsequent steps in FIG. 3B and switches the operation mode of the NW camera 101 from the STA mode to the AP mode. Alternatively, if it is determined that the connection with the AP 103 is disconnected, the NW camera 101 can re-attempt to connect with the AP 103. In this case, if the NW camera 101 attempts to connect with the AP 103 for a predetermined period or a predetermined number of times and fails, the processing in step S318 in FIG. 3B can be performed to switch the operation mode of the NW camera 101 from the STA mode to the AP mode.

At least part or all of the flowcharts in FIGS. 3A and 3B can be realized by hardware. To realize part or all of the flowcharts by hardware, a dedicated circuit can be generated on a field-programmable gate array (FPGA) based on a program for realizing the steps using, for example, a predetermined compiler, and be used. A gate array circuit can be formed as in the case of FPGA to realize part or all of the flowcharts by hardware. An application-specific integrated circuit (ASIC) can be used to realize part or all of the flowcharts. The steps in the flowcharts in FIGS. 3A and 3B can be distributed to and performed by a plurality of CPUs (not illustrated) or apparatuses (not illustrated).

In the present exemplary embodiment, the user sets administrator information and inputs connection destination information via the web browser displayed on the screen of the terminal 102. The present exemplary embodiment is not limited to the foregoing, and a predetermined application for inputting, deleting, and changing connection destination information about the AP with which the NW camera 101 is to be connected can be used. In this case, the flowchart for the terminal 102 in FIG. 3A can be started in response to the activation of the predetermined application.

In the present exemplary embodiment, the NW camera 101 operates in the AP mode when receiving connection destination information from the terminal 102. The present exemplary embodiment is not limited to the foregoing, and the NW camera 101 can operate as a group owner based on the Wi-Fi Direct® standards or as a station in an ad hoc mode when receiving connection destination information from the terminal 102.

While the AP 103 is an access point in the present exemplary embodiment, the present exemplary embodiment is not limited to the foregoing, and the AP 103 can be an apparatus that operates as a group owner based on the Wi-Fi Direct® standards. The AP 103 can be an apparatus that operates as a station in the ad hoc mode.

While the exemplary embodiment has been described in detail, the present disclosure is also applicable to, for example, systems, apparatuses, methods, programs, and recording mediums (storage mediums). More specifically, the present disclosure is also applicable to a system including a plurality of devices (e.g., host computer, interface device, image capturing apparatus, web application, etc.) and is also applicable to an apparatus consisting of a single device.

One or more functions of the above-described exemplary embodiment can be realized by supplying a program to a system or apparatus via a network or storage medium and one or more processors of a computer of the system or apparatus reading and executing the program. The one or more functions can also be realized by a circuit (e.g., ASIC).

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present disclosure is directed to a technique for enabling a communication apparatus that received connection destination information for wirelessly communicating with another communication apparatus to re-connect with the communication apparatus that transmitted the connection destination information in the case where the communication apparatus that received the connection destination information fails to connect with the another communication apparatus.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-191761, filed Sep. 29, 2017, which is hereby incorporated by reference herein in its entirety.

What is claimed is:
1. A communication apparatus comprising:
one or more processors; and
one or more memories including instructions that, in a case where executed by the one or more processor, cause the apparatus to:
create a first wireless network for communicating in compliance with a predetermined communication standard;
receive first connection destination information for joining a second wireless network for communicating in compliance with the predetermined communication standard from first another communication apparatus via the first wireless network;
end the first wireless network in a case where the first connection destination information is received;
attempt to join the second wireless network based on the first connection destination information in the case where the first connection destination information is received; and
re-create the first wireless network that was ended to communicate again with the first another communication apparatus in response to a failure of the attempt to join the second wireless network,
wherein the first another communication apparatus is notified of the failure of the attempt to join the second wireless network via the re-created first wireless network.
2. The communication apparatus according to claim 1, the processor executing the instructions further causes the communication apparatus to:
capture an image,
wherein the communication apparatus transmits via the second wireless network image data corresponding to the image in a case where the second wireless network is joined.

3. The communication apparatus according to claim 1, the processor executing the instructions further causes the communication apparatus to:
- switch a role of the communication apparatus from a first role of creating a wireless network to a second role of joining the second wireless network in a case where the first connection destination information is received; and
- switch the role of the communication apparatus from the second role to the first role in response to the failure of the attempt to join the second wireless network.

4. The communication apparatus according to claim 3, wherein the first role is a role of operating as an access point of an IEEE 802.11 series standard and the second role is a role of operating as a station.

5. The communication apparatus according to claim 1, wherein the communication apparatus receives second connection destination information via the re-created first wireless network.

6. The communication apparatus according to claim 5, wherein the second connection destination information is information for joining the second wireless network.

7. The communication apparatus according to claim 5, the processor executing the instructions further causes the communication apparatus to:
- store a first administrator information for performing user authentication;
- acquire a second administrator information from the first another communication apparatus in a case where the first wireless network is created and the communication apparatus stores the first administrator information; and
- attempt to join a wireless network based on the second connection destination information in a case where the stored first administrator information matches the acquired second administrator information; and
- not to attempt to join the wireless network based on the second connection destination information in a case where the first administrator information does not match the second administrator information.

8. The communication apparatus according to claim 7, wherein the processor executing the instructions further causes the communication apparatus to acquire the first administrator information from the first another communication apparatus in a case where the first wireless network is created and the communication apparatus does not store the first administrator information,
- wherein the communication apparatus stores the acquired first administrator information.

9. The communication apparatus according to claim 1, wherein the processor executing the instructions further causes the communication apparatus to search for the second wireless network based on the first connection destination information.

10. The communication apparatus according to claim 9, searching for the second wireless network is based on whether a service set identifier (SSID) contained in a beacon transmitted by a second another communication apparatus creating the second wireless network matches an SSID included in the first connection destination information or whether a probe request containing the SSID included in the first connection destination information is transmitted and a probe response is received.

11. The communication apparatus according to claim 1, further comprising notifying the first another communication apparatus of a reason for the failure of the attempt to join the second wireless network.

12. The communication apparatus according to claim 1, wherein the first connection destination information contains an SSID.

13. The communication apparatus according to claim 12, wherein the first connection destination information contains a password.

14. The communication apparatus according to claim 1, the predetermined communication standard is a communication standard based on an IEEE 802.11 series standard.

15. A method of controlling a communication apparatus, the method comprising:
- creating a first wireless network for communicating in compliance with a predetermined communication standard;
- receiving connection destination information for joining a second wireless network for communicating in compliance with the predetermined communication standard from first another communication apparatus via the created first wireless network;
- ending the first wireless network in a case where the connection destination information is received;
- attempting to join the second wireless network based on the connection destination information in a case where the connection destination information is received;
- re-creating the first wireless network that was ended to communicate again with the first another communication apparatus in response to a failure of the attempt to join the second wireless network; and
- notifying the first another communication apparatus of the failure of the attempt to join the second wireless network via the re-created first wireless network.

16. A non-transitory computer-readable storage medium storing a computer program for causing a computer to execute a control method of a communication apparatus, the method comprising:
- creating a first wireless network for communicating in compliance with a predetermined communication standard;
- receiving connection destination information for joining a second wireless network for communicating in compliance with the predetermined communication standard from first another communication apparatus via the created first wireless network;
- ending the first wireless network in a case where the connection destination information is received;
- attempting to join the second wireless network based on the connection destination information in a case where the connection destination information is received;
- re-creating the first wireless network that was ended to communicate again with the first another communication apparatus in response to a failure of the attempt to join the second wireless network; and
- notifying the first another communication apparatus of the failure of the attempt to join the second wireless network via the re-created first wireless network.

* * * * *